(12) United States Patent
Bando et al.

(10) Patent No.: US 11,173,726 B2
(45) Date of Patent: Nov. 16, 2021

(54) INKJET PRINTING APPARATUS, INKJET PRINTING METHOD

(71) Applicant: MIMAKI ENGINEERING CO., LTD., Nagano (JP)

(72) Inventors: Kazuki Bando, Nagano (JP); Hironori Hashizume, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 49 days.

(21) Appl. No.: 16/596,791

(22) Filed: Oct. 9, 2019

(65) Prior Publication Data

US 2020/0114661 A1 Apr. 16, 2020

(30) Foreign Application Priority Data

Oct. 15, 2018 (JP) .............................. JP2018-194368

(51) Int. Cl.
| | |
|---|---|
| *B41J 11/00* | (2006.01) |
| *C09D 11/38* | (2014.01) |
| *C09D 11/322* | (2014.01) |
| *B41J 2/045* | (2006.01) |
| *B32B 38/00* | (2006.01) |
| *B41M 5/52* | (2006.01) |

(52) U.S. Cl.
CPC ........... *B41J 11/002* (2013.01); *B32B 38/145* (2013.01); *B41J 2/04501* (2013.01); *B41M 5/5254* (2013.01); *C09D 11/322* (2013.01); *C09D 11/38* (2013.01); *B41J 2202/20* (2013.01)

(58) Field of Classification Search
CPC ...... C09D 11/101; C09D 11/38; B41J 11/002; B41J 11/00214; B41J 2/2107; B41M 7/0081; B41M 7/0027
See application file for complete search history.

(56) References Cited

U.S. PATENT DOCUMENTS

| | | | | |
|---|---|---|---|---|
| 2007/0202437 | A1* | 8/2007 | Ishibashi ................. | G03F 7/038 430/270.1 |
| 2010/0239777 | A1* | 9/2010 | Nakajima ............ | C09D 11/322 427/508 |

(Continued)

FOREIGN PATENT DOCUMENTS

| | | |
|---|---|---|
| JP | 5614529 | 10/2014 |
| JP | 5832946 | 12/2015 |
| JP | 6038831 | 12/2016 |

*Primary Examiner* — John Zimmermann
(74) *Attorney, Agent, or Firm* — JCIPRNET

(57) ABSTRACT

To provide an inkjet printing apparatus that improves the smoothness of an ink surface and improves image quality. Provided is an inkjet printing apparatus for printing a UV curable ink onto a print medium. The inkjet printing apparatus including: an ejection unit configured to eject the UV curable ink; and a UV light source configured to irradiate, with ultraviolet light, the UV curable ink landed on the print medium, the print medium being formed from vinyl chloride. The inkjet printing apparatus further includes a heating unit configured to heat the print medium. The heating unit either heats the print medium to a temperature at which a solvent contained in the UV curable ink landed on the print medium does not volatilize or heats the print medium in a state in which the UV curable ink that lands on the print medium contains substantially no solvent.

15 Claims, 7 Drawing Sheets

(56) References Cited

U.S. PATENT DOCUMENTS

| | | | |
|---|---|---|---|
| 2011/0152397 A1* | 6/2011 | Breton | C09D 11/34 |
| | | | 522/42 |
| 2012/0062665 A1* | 3/2012 | Roof | B41F 23/08 |
| | | | 347/99 |
| 2012/0128890 A1* | 5/2012 | Mirchev | B41M 7/0081 |
| | | | 427/493 |
| 2014/0154480 A1* | 6/2014 | Toyoda | C09D 11/38 |
| | | | 428/195.1 |
| 2014/0154481 A1* | 6/2014 | Toyoda | C09D 11/101 |
| | | | 428/195.1 |
| 2016/0060472 A1* | 3/2016 | Takahashi | C09D 133/08 |
| | | | 522/18 |
| 2016/0244628 A1* | 8/2016 | Breton | B29C 64/40 |
| 2017/0058138 A1* | 3/2017 | Kida | C09D 11/322 |
| 2017/0114234 A1* | 4/2017 | Konda | C09D 11/101 |
| 2017/0137642 A1* | 5/2017 | Takiguchi | C09D 11/32 |
| 2019/0169450 A1* | 6/2019 | Wang | B29C 35/0805 |
| 2020/0024468 A1* | 1/2020 | Koyama | C09D 11/102 |

* cited by examiner

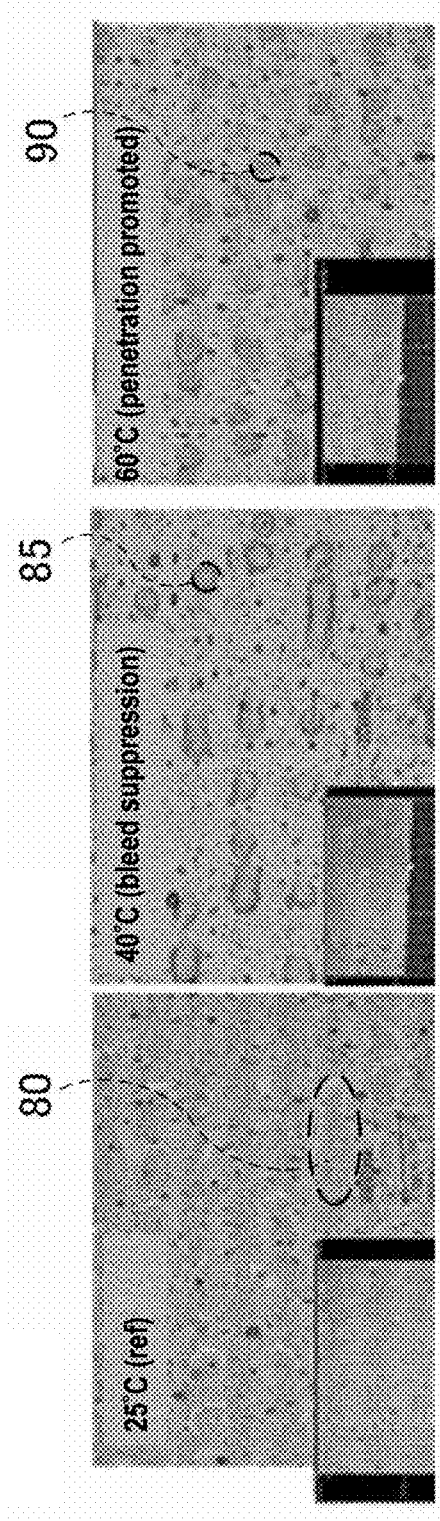
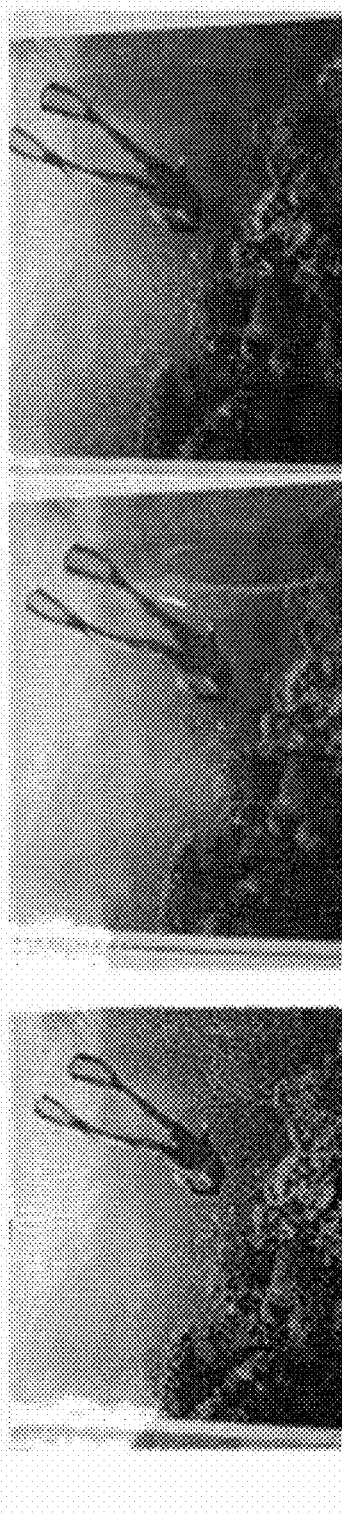
FIG. 4A  FIG. 4B  FIG. 4C
FIG. 4D  FIG. 4E  FIG. 4F

| print medium temperature (°C) | UV irradiation curing rate within 10 sec of landing (%) | smoothness Sa (μm) | bleeding (image quality) | curability |
|---|---|---|---|---|
| 25 | 0 | 4.5 | × | × |
| 40 | 0 | 3.9 | ○ | ○ |
| 60 | 0 | 1.7 | ○ | ○ |
| 25 | 10 | 3.9 | × | × |
| 40 | 10 | 3.4 | ○ | ○ |
| 60 | 10 | 2.5 | ○ | ○ |
| 25 | 50 | 10.3 | ○ | ○ |
| 40 | 50 | 9.4 | ○ | ○ |
| 60 | 50 | 8.9 | ○ | ○ |

FIG. 6

INKJET PRINTING APPARATUS, INKJET PRINTING METHOD

CROSS REFERENCE TO RELATED APPLICATIONS

This application claims the priority benefit of Japanese Patent Application No. 2018-194368, filed on Oct. 15, 2018. The entirety of the above-mentioned patent application is hereby incorporated by reference herein and made a part of this specification.

TECHNICAL FIELD

The present disclosure relates to an inkjet printing apparatus and an inkjet printing method.

BACKGROUND ART

An inkjet printing apparatus that prints a UV curable ink by ejection onto a print medium and emits ultraviolet light for curing is capable of printing onto a variety of media for a high-quality, stable image and is reliable. Such an inkjet printing apparatus also has the advantages of high-speed production because photocuring is possible immediately after printing, making time for drying the ink unnecessary, and of a small installation space. However, UV curable inkjet printing has the disadvantage of poor smoothness due to the relatively large unevenness of the ejected UV curable ink on the printing face, and the printing face is generally matte (lusterless or having a matte base).

FIG. 7A is an explanatory view of an inkjet printing apparatus 201. The inkjet printing apparatus 201 includes an ejection unit 210 that vertically ejects UV curable ink toward a print medium 250, and a UV light source 220 that emits ultraviolet light. The print medium 250 is mounted on a printing table 240 disposed at a position opposing the ejection unit 210 that ejects UV curable ink droplets 260 to print on the print medium 250. When ultraviolet light 270 from the UV light source 220 is emitted as shown in FIG. 7B immediately after UV curable ink 265 has landed on the print medium 250, the UV curable ink 265 cures while maintaining an ink layer surface S with large unevenness. More specifically, the ink layer surface S becomes matte.

In order to obtain, in contrast, a high-luster printing face with favorable smoothness, a method can be considered in which the time during which the ink retains fluidity after landing is lengthened. However, if there is too much ink fluidity, the image quality deteriorates due to interference in the ink landing, i.e., mixing of the ink colors. With the current technology, there is a trade-off between improving the smoothness and improving the image quality.

When vinyl chloride is used as the medium, a solvent ink with a pigment dispersed in an organic solvent may be used instead of a UV curable ink in order to improve the weatherability, the abrasion resistance, and the adhesion. However, a strong irritant smell is produced that adversely affects the environment when the organic solvent vaporizes, time is needed for drying after printing, and the solvent resistance is low.

Patent Literature 1: Japanese Patent No. 5832946
Patent Literature 2: Japanese Patent No. 5614529
Patent Literature 3: Japanese Patent No. 6038831

SUMMARY

An ink composition has been proposed in which the internal curability of the UV curable ink is enhanced and the area near the surface of the UV curable ink layer after landing is made more susceptible to oxygen inhibition as a technique for both improving the smoothness and obtaining a favorable image quality in UV curable inkjet printing (refer to Patent Literature 1). However, with such an ink composition, the curability is low, so curing defects readily occur in low print density portions and the coating performance may deteriorate.

Varying the ultraviolet light irradiation conditions to both improve smoothness and obtain a favorable image quality has been disclosed as another technique (refer to Patent Literature 2). However, the smoothness and image quality may be inadequate, and curing defects may also occur in low print density portions.

A technique has been disclosed in which a gelling agent is added to a UV curable ink as the ink composition, and the UV curable ink is held at a high temperature during ejection to lower the viscosity and the UV curable ink is quickly cooled to no greater than the gelling temperature after landing on the print medium (refer to Patent Literature 3). More specifically, the UV curable ink flows over the surface of the print medium and becomes smooth before dropping to the gelling temperature, and the ink increases in viscosity such that the colors do not mix. However, this has the disadvantages that a large heating mechanism is needed at the periphery of the head provided with the ejection unit or in the ink flow channel for stable ejection of the UV curable ink, raising the equipment costs and increasing the power consumption.

Taking such circumstances into consideration, the present disclosure provides an inkjet printing apparatus that improves the smoothness of the ink layer surface and improves the image quality.

In the present disclosure, when vinyl chloride is used as the print medium, the temperature of the print medium is increased and a monofunctional monomer with a low molecular weight is used as a photopolymerization component of the UV curable ink to promote penetration into the print medium after the UV curable ink lands on the ink medium, whereby the smoothness is improved and a favorable image quality is obtained at the same time.

(1) The present disclosure provides an inkjet printing apparatus for printing a UV curable ink onto a print medium, the inkjet printing apparatus including: an ejection unit configured to eject the UV curable ink; and a UV light source configured to irradiate an ultraviolet light to the UV curable ink landed on the print medium, the print medium being formed from vinyl chloride, in which the inkjet printing apparatus further includes a heating unit configured to heat the print medium, and the heating unit either heats the print medium to a temperature at which a solvent contained in the UV curable ink landed on the print medium does not volatilize or heats the print medium in a state in which the UV curable ink that lands on the print medium contains substantially no solvent.

In the disclosure described in (1), the inkjet printing apparatus includes a heating unit configured to heat the print medium, so when vinyl chloride is used as the print medium, an excellent effect is exhibited in which penetration of the UV curable ink into the print medium is promoted, the smoothness of the ink layer surface improves and a favorable image quality is obtained.

(2) The present disclosure provides the inkjet printing apparatus described in (1), in which the UV curable ink contains substantially no solvent and contains at least 30 wt % of a monomer with a molecular weight of 300 or less.

In the disclosure described in (2), a UV curable ink containing a low-molecular-weight monomer with a molecular weight of 300 or less is used as a monomer for carrying out photopolymerization, so there is an excellent effect in which the penetration into the print medium is enhanced, the UV curable ink ejected from the ejection unit and landing on the print medium easily penetrates therein even if the heating temperature of the print medium is low, e.g., 40° C., the smoothness of the ink layer surface is improved, and a favorable image quality is obtained.

(3) The present disclosure provides the inkjet printing apparatus described in (2), in which the monomer being a monofunctional monomer.

In the disclosure described in (3), the UV curable ink, which contains a monofunctional monomer as a monomer for carrying out a photopolymer reaction, is used, so an excellent effect is exhibited in which the UV curable ink ejected from the ejection unit and landing on the print medium easily penetrates therein, the smoothness of the ink layer surface is improved, and a favorable image quality is obtained.

(4) The present disclosure provides the inkjet printing apparatus described in (2) or (3), in which the monomer contains 13 wt % to 22 wt % of N-vinyl-ε-caprolactam as a component in the UV curable ink.

In the disclosure described in (4), the UV curable ink contains N-vinyl-ε-caprolactam, which is an N-vinyl compound, so that when the UV curable ink contains an acrylate compound, photopolymerization occurs more easily, and therefore an excellent effect is exhibited in which photopolymerization occurs quickly after the ultraviolet light irradiation so that the ink colors do not mix easily.

(5) The present disclosure provides the inkjet printing apparatus described in any one of (1) to (4), in which the UV light source irradiates the ultraviolet light to the UV curable ink landed on the print medium, so as to maintain a state in which a curing rate of the UV curable ink is no greater than 10% within 10 seconds of landing on the print medium.

In the disclosure described in (5), the UV light source irradiates the print medium with the ultraviolet light so as to maintain a state in which the curing rate of the UV curable ink is no greater than 10% within 10 seconds of the landing on the surface of the print medium, and therefore an excellent effect is exhibited in which the penetration of the UV curable ink into the print medium is promoted, improving the smoothness, and excessive fluidity is suppressed so the ink colors do not mix easily.

(6) The present disclosure provides the inkjet printing apparatus described in (5), in which a provisional curing is carried out in which the UV curable ink lands on the print medium and is provisionally cured with the ultraviolet light emitted by the UV light source and then, after a prescribed time has elapsed, a permanent curing is carried out by emitting the ultraviolet light again to complete the curing.

In the disclosure described in (6), the UV curable ink lands on the surface of the print medium, the ultraviolet light is emitted from the UV light source, and after a prescribed time has elapsed, the ultraviolet light is emitted again to carry out the permanent curing in which the UV curing is completed, and therefore an excellent effect is exhibited in which the UV curable ink penetrates into the print medium, improving the smoothness, and the UV curable ink does not flow excessively, so the ink colors do not mix easily, for a favorable image quality.

(7) The present disclosure provides the inkjet printing apparatus described in any one of (1) to (6), further including a lamination unit configured to paste a laminate film on the UV curable ink after printing.

If the smoothness of the ink layer surface is poor, when the transparent laminate film is pasted on the surface of the printed matter for protection, fine bubbles are caught along the unevenness of the ink surface layer, and visible defects called silver rings occur. In the disclosure described in (7), the smoothness of the ink layer surface is improved, so an excellent effect is exhibited in which silver rings are suppressed.

(8) The present disclosure provides an inkjet printing method for printing a UV curable ink onto a print medium, the inkjet printing method including: an ejection step for ejecting the UV curable ink; and a heating step for heating the print medium, in which the print medium formed from vinyl chloride is used as the print medium, and the print medium is heated.

In the disclosure described in (8), a UV curable inkjet printing method includes a heating step for heating the print medium, so when vinyl chloride is used as the print medium, an excellent effect is exhibited in which penetration of the UV curable ink into the print medium is promoted, and the smoothness of the ink layer surface improves.

The UV curable inkjet printing method described in (8) may be considered as a method for producing printed matter.

In the inkjet printing apparatus and the UV curable inkjet printing method according to the disclosures described in (1)~(8), when vinyl chloride is used as the print medium, an excellent effect is exhibited in which penetration of the UV curable ink into the print medium is promoted, the smoothness of the ink layer surface improves and a favorable image quality is obtained.

BRIEF DESCRIPTION OF THE DRAWINGS

FIG. 4A is a microphotograph of the ink layer surface after printing without heating the print medium (25° C.) and before emitting ultraviolet light for permanent curing.

FIG. 4B is a microphotograph of the ink layer surface after printing with the print medium heated to 40° C. and before emitting ultraviolet light for permanent curing.

FIG. 4C is a microphotograph of the ink surface after printing with the print medium heated to 60° C. and before emitting ultraviolet light for permanent curing.

FIG. 4D is an example of a printing sample for evaluating image quality when printing without heating the print medium (25° C.).

FIG. 4E is an example of a printing sample for evaluating image quality when printing with the print medium heated to 40° C.

FIG. 4F is an example of sample printing for evaluating image quality when printing with the print medium heated to 60° C.

FIG. 6 is the experimental results of the dependency of the smoothness (surface smoothness, i.e., the arithmetic mean height Sa, of the ink layer), image quality, and curability on the surface temperature of the print medium and on the UV irradiation curing rate within 10 seconds of the landing of the UV curable ink.

DESCRIPTION OF EMBODIMENTS

Figure 1:
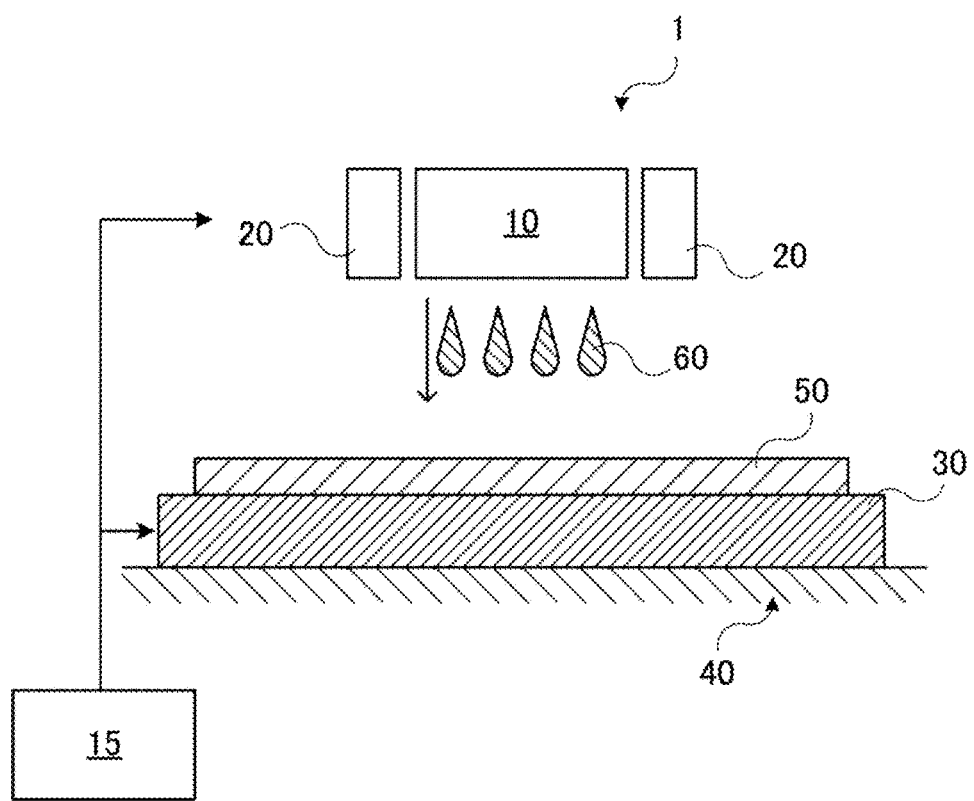
FIG. 1 is an explanatory view of the inkjet printing apparatus in an embodiment of the present disclosure.

Embodiments of the present disclosure are described below with reference to the drawings.

FIGS. 1 to 6 are examples of modes for working the disclosure, the same reference signs are used for the same parts in the drawings, and the basic configuration is the same as the conventional configuration shown in the drawings.

FIG. 1 is an explanatory view of the inkjet printing apparatus in an embodiment of the present disclosure. The inkjet printing apparatus 1 includes an ejection unit 10 for vertically ejecting UV curable ink onto a print medium 50, a UV light source 20 for emitting ultraviolet rays, a print medium heating unit 30 for heating the print medium 50, a control unit 15 for controlling the entire inkjet printing apparatus 1, including the heat control of the print medium heating unit 30, and a printing table 40 for supporting the print medium heating unit 30.

Specifically, the inkjet printing apparatus 1 in the embodiment of the present disclosure uses vinyl chloride as the print medium 50 and heats the surface thereof to promote the penetration of the UV curable ink into the print medium 50.

The UV light source 20 is an LED capable of emitting ultraviolet light having a center wavelength of, for example, 365 nm to 410 nm.

The print medium heating unit 30 includes a heater for heating, a temperature sensor for measuring the temperature of the print medium 50, and the like, and a detailed description is omitted as such details are known technology. Of course, the temperature measurement may be done using a non-contact technique, and the print medium 50 may be heated with infrared light irradiation or the like instead of a heater.

The control unit 15 is configured from a CPU, a RAM, a ROM and the like, and executes various controls. A CPU is what is called a central processing unit that executes various programs to achieve various functions. A RAM is used as a CPU work region and a storage region, and a ROM stores an operation system and programs executed by the CPU.

Figure 2A:
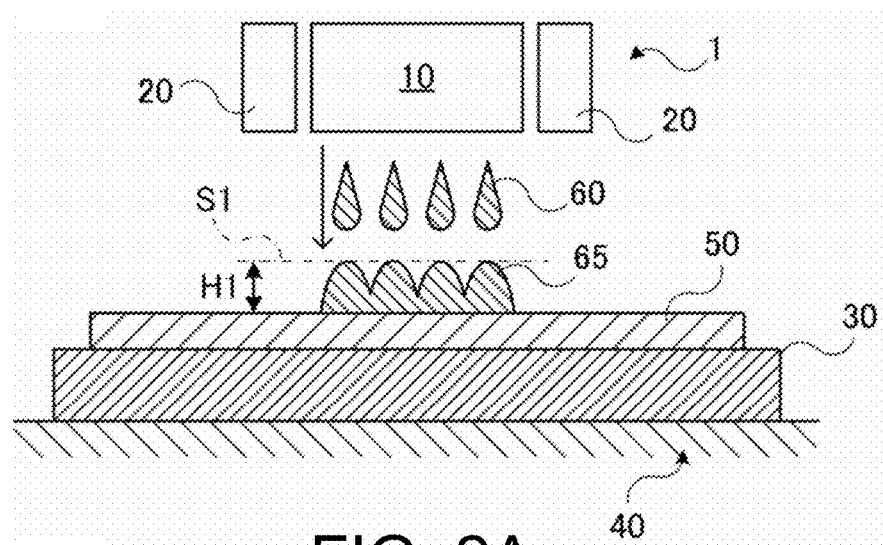
FIG. 2A is an explanatory view of a mode in which UV curable ink is printed onto a print medium by ejection from the ejection unit of the inkjet printing apparatus.

FIG. 2A is an explanatory view of a mode in which UV curable ink droplets 60 are printed onto the print medium 50 by ejection from the ejection unit 10 of the inkjet printing apparatus 1. The print medium 50 is heated by the print medium heating unit 30, and the surface temperature of the print medium 50 is maintained by the control unit 15 at 40° C., for example. The UV curable ink droplets 60 after landing form an uneven ink layer surface S1 having a height H1 at the highest location.

Figure 2B:
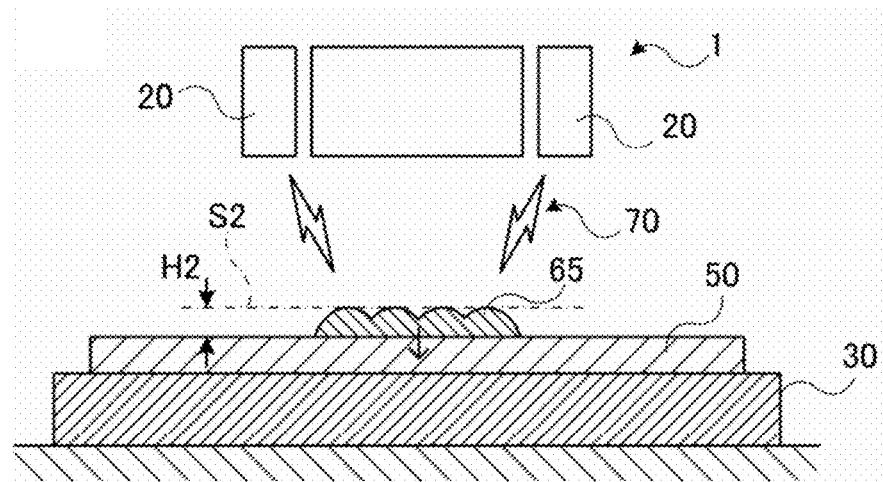
FIG. 2B is an explanatory view illustrating the penetration of the UV curable ink into vinyl chloride, which is the print medium, after landing on the print medium.

FIG. 2B is an explanatory view illustrating the penetration of the UV curable ink droplets 60 into vinyl chloride, which is the print medium 50, after landing thereon. Before the permanent curing (refer to FIG. 2C) is carried out, ultraviolet light 70 is preliminarily emitted (preliminary irradiation) in order to adjust the fluidity of the UV curable ink 65. Specifically, the UV light source 20 irradiates the print medium 50 with the ultraviolet light 70 so as to maintain the curing rate of the UV curable ink 65 to no greater than 10% within 10 seconds of the UV curable ink 65 landing on the surface of the print medium 50.

The UV curable ink 65 penetrates into the print medium 50 and therefore a height H2 of the highest location of the ink layer surface S2 is lower than H1 and the ink layer surface S2 is smoothed. Because the fluidity of the UV curable ink 65 is adjusted, it is possible to prevent the mixing of ink colors, which occurs when the UV curable ink 65 has excessive fluidity, and contribute to improving the image quality.

Figure 2C:
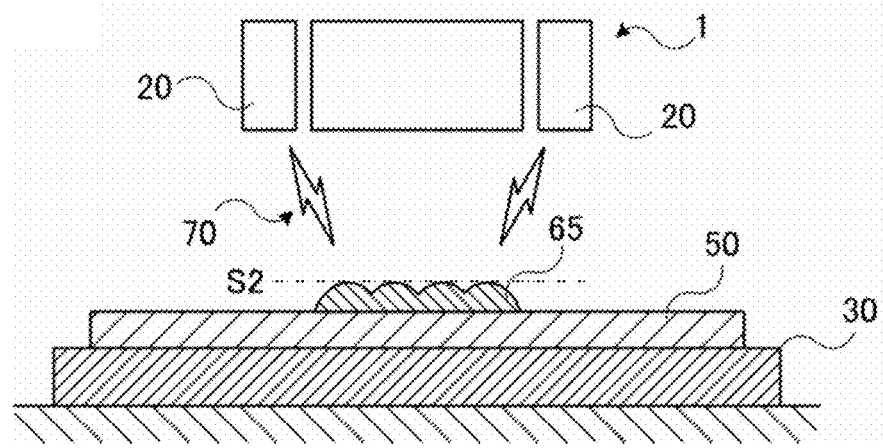
FIG. 2C is an explanatory view of the emission of ultraviolet light for permanently curing the UV curable ink.

FIG. 2C is an explanatory view of the emission of ultraviolet light for permanently curing the UV curable ink 65. The ultraviolet light 70 from the UV light source 20 of the inkjet printing apparatus 1 is emitted onto the UV curable ink 65, which cures. In further detail, the UV curable ink 65 lands on the surface of the print medium 50, ultraviolet light from the UV light source 20 is preliminarily emitted (refer to FIG. 2B), and after a prescribed time has passed, the permanent curing is carried out by emitting ultraviolet light again to complete the UV curing.

The UV curable ink 65 used in the inkjet printing apparatus 1 is described in detail.

In general, the UV curable ink 65 contains a polymerizable compound, a diluent monomer, a photopolymerization initiator, an additive, and a coloring matter. In order to carry out inkjet printing, a low viscosity is needed such that appropriate ejection from the ejection unit 10 is possible.

In further detail, the UV curable ink 65 includes at least 30 wt % of a monomer with a molecular weight of 300 or less and desirably a monomer with a molecular weight of 250 or less as the polymerizable compound. More specifically, the monomer is a monofunctional monomer and contains, as a component, 13 to 22 wt % of a N-vinyl compound, specifically, N-vinyl-ε-caprolactam.

Examples of the monofunctional monomer that can be favorably used in the present disclosure include known acrylate monomers. Examples include monofunctional monomers such as hexyl acrylate, 2-ethylhexyl acrylate, tert-octyl acrylate, isoamyl acrylate, decyl acrylate, isodecyl acrylate, cyclohexyl acrylate, 4-n-butyl cyclohexyl acrylate, bornyl acrylate, isobornyl acrylate, benzyl acrylate, lauryl acrylate, 2-hydroxyethyl acrylate, 2-hydroxypropyl acrylate, 2-acryloyloxy ethyl succinate, tetrahydrofurfuryl acrylate, and phenoxyethyl acrylate.

Specific examples of the N-vinyl compound favorably used in the present disclosure include, in addition to the N-vinyl-ε-caprolactam mentioned above, N-vinylformamide, N-vinylcarbazole, N-vinylindole, N-vinylpyrrole, N-vinylacetamide, N-vinylpyrrolidone, N-vinylcaprolactam, and derivatives thereof.

Specific examples of the photopolymerization initiator favorably used in the present disclosure include acetophenone, 2,2-diethoxyacetophenone, p-dimethylaminoacetophenone, benzophenone, 2-chlorobenzophenone, p,p'-dichlorobenzophenone, p,p'-bis diethylamino benzophenone, Michler's ketone, benzyl, benzoin, benzoin methyl ether, benzoin ethyl ether, benzoin isopropyl ether, benzoin-n-propyl ether, benzoin isobutyl ether, benzoin-n-butyl ether, benzyl methyl ketal, 2,2-dimethoxy-1,2-diphenylethane-1-one, 1-hydroxycyclohexyl phenyl ketone, 2-hydroxy-1-{4-[4-(2-hydroxy-2-methyl propionyl)benzyl]phenyl}2-methylpropane-1-one, 2-benzyl-2-dimethylamino-1-(4-morpholinophenyl)butanone-1, 2-dimethylamino-2-(4-methylbenzyl)-1-(4-morpholine-4-yl-phenyl)butane-1-one, 2,4,6-trimethylbenzoyl diphenylphosphine oxide, bis(2,4,6-trimethylbenzoyl)phenylphosphine oxide, bis(2,6-dimethoxybenzoyl)-2,4,4-trimethylpentyl phosphine oxide, 2-methyl-1-[4-(methylthio)phenyl]2-morpholinopropane-1-one, thioxanthone, 2-chlorothioxanthone, 2-hydroxy-2-methyl-1-phenyl-1-one, 1-(4-isopropylphenyl)-2-hydroxy-2-methylpropane-1-one, methylbenzo fill formate, azobisisobutyronitrile, benzoyl peroxide, and di-tert-butyl peroxide.

Examples of coloring matters that may be favorably used in the present disclosure include dyes and pigments, and an organic or inorganic pigment may be used as the pigment.

Examples of red and magenta pigments that may be used include Pigment Reds 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violets 3, 19, 23, 29, 30, 37, 50, and 88, and Pigment Oranges 13, 16, 20, and 36.

Examples of blue and cyan pigments that may be used include Pigment Blues 1, 15, 15:1, 15:2, 15:3, 15:4, 15:6, 16, 17-1, 22, 27, 28, 29, 36, and 60.

Examples of green pigments that may be used include Pigment Greens 7, 26, 36, and 50.

Examples of yellow pigments that may be used include Pigment Yellows 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of black pigments that may be used, according to the purpose, include Pigment Blacks 7, 28, and 26.

Example 1

An example is described below in detail, but the modes of the present disclosure are not limited to this embodiment.

Polymerizable compound: 30 wt % of tetrahydrofurfuryl acrylate, 30 wt % of phenoxyethyl acrylate, and 15 wt % of isobornyl acrylate Vinyl compound: 18 wt % of N-vinyl-ε-caprolactam Photopolymerization initiator: 2,4,6-trimethylbenzoyl diphenylphosphine oxide Vinyl chloride (Hakuenbi G-137-50 SPC0706 manufactured by MIMAKI ENGINEERING CO., LTD.) was used as the print medium.

The 100% cyan, 100% magenta, and 100% yellow print density portions were measured with a laser microscope.

The ultraviolet light irradiation for the permanent curing was set so that the integrated amount of light at 1600 mW/cm$^2$ was 1000 mJ/cm$^2$. The center wavelength of the emitted ultraviolet light was 365 nm. The ultraviolet light irradiation curing rate was calculated such that the integrated amount of light was 100% when the peak derived from an acryloyl group completely disappeared in FTIR.

An experiment was carried out to confirm the effect of heating the print medium.

Figures 3A, 3B:
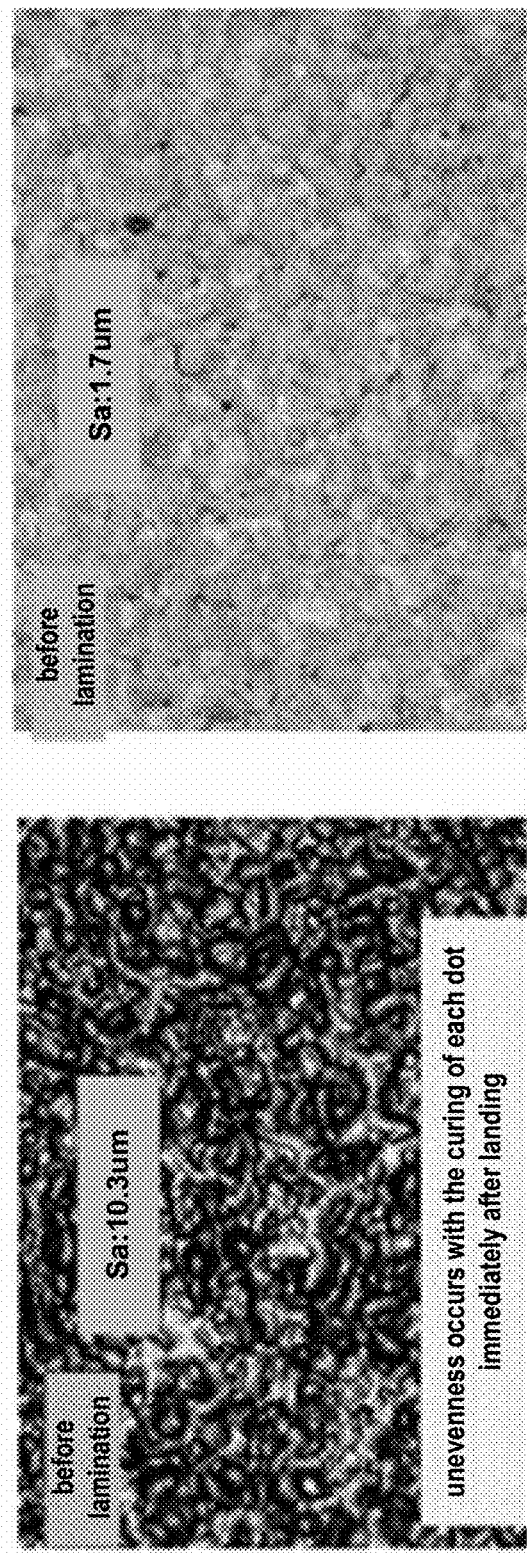
FIG. 3A is an experimental result illustrating the surface roughness of the ink layer when UV curable ink is printed without heating the print medium (25° C.).
FIG. 3B is an experimental result illustrating the surface roughness of the ink surface when printing with the print medium heated to 60° C.

FIG. 3A is the experimental result illustrating the surface roughness of the ink layer when UV curable ink was printed without heating the print medium (25° C.). The ultraviolet light irradiation curing rate 10 seconds after landing was 50%. The UV curable ink cured after landing on the print medium, forming an uneven ink layer surface. Specifically, the surface roughness, i.e., the arithmetic mean height Sa, was found to be 10.3 μm.

In contrast, FIG. 3B is the experimental result illustrating the surface roughness of the ink surface when printing with the print medium heated to 60° C. The ultraviolet light irradiation curing rate 10 seconds after the landing was 0%. There was no unevenness in the ink layer surface, and specifically, the surface roughness, i.e., the arithmetic mean height Sa, was found to be 1.7 μm. By heating the print medium, the penetration of the UV curable ink into the print medium was promoted, improving the smoothness.

FIG. 4A is a microphotograph of the ink layer surface before emitting ultraviolet light for permanent curing after printing without heating the print medium (25° C.). The UV curable ink bled to the extent of forming an ink pool nearly 100 μm wide as shown with bled ink 80 surrounded by the dotted line.

In contrast, FIG. 4B is a microphotograph of the ink layer surface after printing with the print medium heated to 40° C. and before emitting ultraviolet rays for permanent curing. The boundary between the location where there is UV curable ink and t where there is not is clear, and it can be understood that the bleeding of ink is suppressed.

FIG. 4C is a microphotograph of the ink surface layer after printing with the print medium heated to 60° C. and before emitting ultraviolet light for permanent curing. The boundary between the location where there is UV curable ink and where there is not is thinner than in FIG. 4B, and it can be understood that the penetration of the UV curable ink into the print medium is promoted, reducing the unevenness in the ink layer surface.

FIG. 4D is an example of a printing sample for image quality evaluation when printing without heating the print medium (25° C.). Whitish dot-like portions are conspicuous overall, the image boundary is unclear, and the image quality is low.

FIG. 4E is an example of a printing sample for evaluating image quality when printing with the print medium heated to 40° C. The white dot-like portions seen in FIG. 4D are reduced and the image boundary is clear, improvements in the image quality compared to the result of FIG. 4D.

FIG. 4F is an example of a printing sample for evaluating image quality when printing with the print medium heated to 60° C. The white dot-like portions are further reduced from FIG. 4E and the image boundary is clear, further improvements in the image quality compared to the result of FIG. 4E.

Figure 5A:
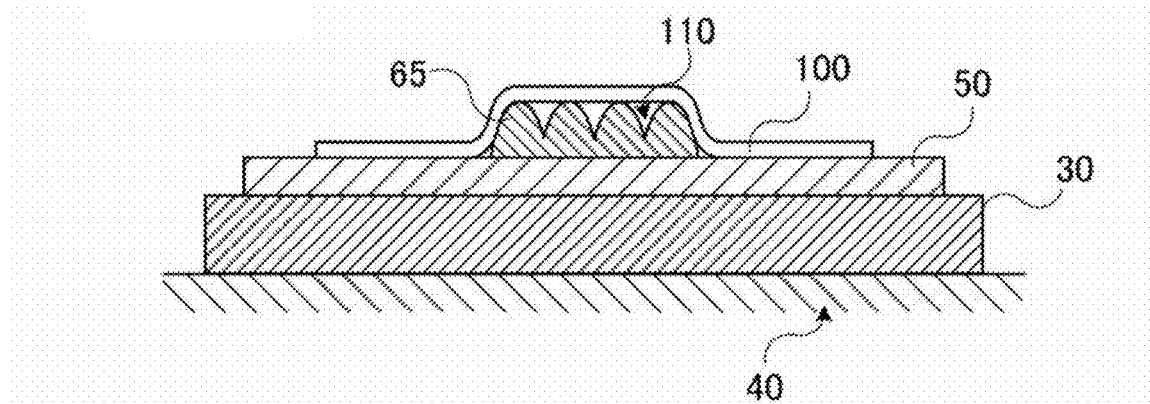
FIG. 5A is an explanatory view of a mode in which a transparent laminate film is pasted on the printing face.

FIG. 5A is an explanatory view of a mode in which a transparent laminate film is pasted on the printing face. In FIG. 5A, the printed result with the print medium 50 unheated by the print medium heating unit 30 is shown schematically. With the UV curable ink 65 printed on the print medium 50, the unevenness of the ink layer surface is large and bubbles 110 are produced between the printing face and the laminate film. Such bubbles 110 produce visual defects called "so-called silver rings". Specifically, the printing appears whitish.

Figure 5B:
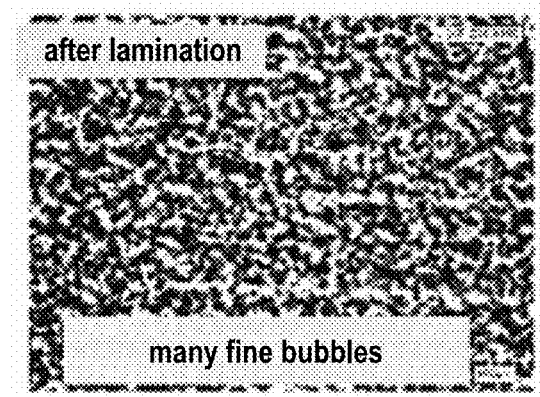
FIG. 5B is a microphotograph of when a laminate film is pasted after printing a UV curable ink without heating the print medium (25° C.).

FIG. 5B is a microphotograph of when a laminate film is pasted after printing a UV curable ink without heating the print medium (25° C.). The ultraviolet light irradiation curing rate 10 seconds after landing was 50%. It can be seen that many fine bubbles were produced.

Figure 5C:
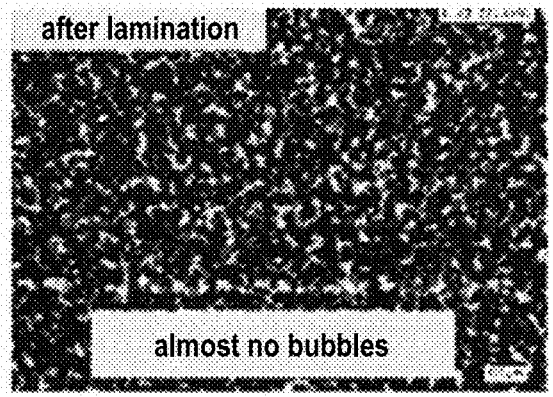
FIG. 5C is a microphotograph of when a laminate film is pasted after printing with the print medium heated to 60° C.
Figure 7A:
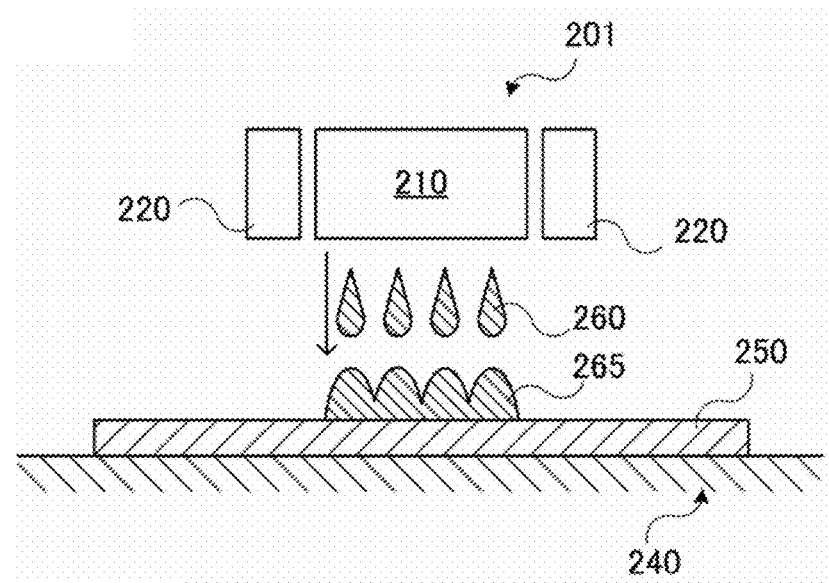
FIG. 7A is an explanatory view of the inkjet printing apparatus.
Figure 7B:
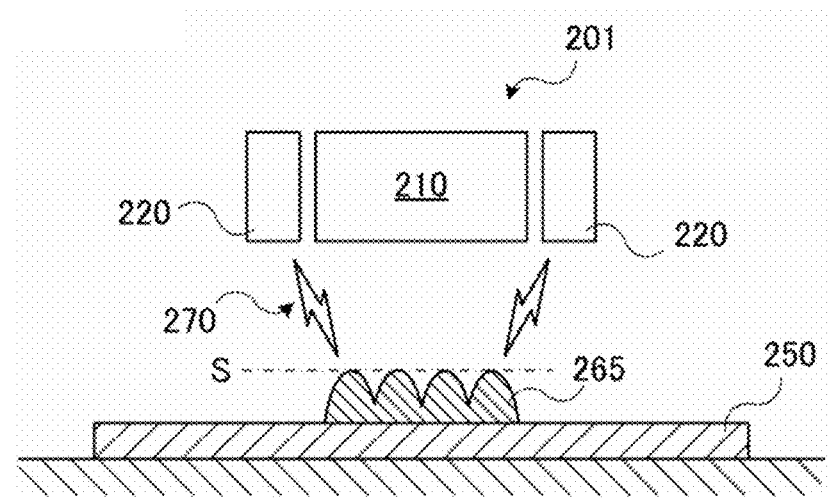
FIG. 7B is an explanatory view of a mode in which a UV light source irradiates UV curable ink with ultraviolet light after landing to photopolymerize and cure the UV curable ink.

In contrast, FIG. 5C is a microphotograph of when a laminate film is pasted after printing with the print medium heated to 60° C. The ultraviolet light irradiation curing rate 10 seconds after landing was 0%. Nearly no bubbles were produced and the printing face and the film face adheres closely.

FIG. 6 is the experimental results of the dependency of the smoothness (surface smoothness, i.e., the arithmetic mean height Sa, of the ink layer), image quality, and curability on the surface temperature of the print medium and on the UV irradiation curing rate within 10 seconds of the landing of the UV curable ink. The surface roughness was measured with a laser microscope. The bleed evaluation was made by visually observing the entire gradient print density portions of CMYK 0 to 100%. Favorable image quality was indicated with an "O" and unfavorable image quality with an "x". When the cyan 10% print density portion was wiped back and forth with a rag for the curability evaluation, streak marks not appearing on the printing face were indicated with an "O" and streak marks appearing were indicated with an "x". In all cases, it can be seen that the higher the temperature of the print medium, the better the smoothness, the image quality, and the curability. In a comparison of the 0% and 10% UV irradiation curability rates within 10 seconds of the landing of the UV curable ink with the 50% UV irradiation curability rate, it can be seen that the 0% and 10% UV irradiation curability rates within 10 seconds of landing show more favorable smoothness.

The inkjet printing apparatus 1 of the embodiment of the present disclosure includes a heating unit 30 for heating the print medium 50, so when vinyl chloride is used as the print medium 50, an excellent effect is exhibited in which penetration of the UV curable ink 65 into the print medium 50 is promoted, the smoothness of the ink layer surface improves and a favorable image quality is obtained.

The inkjet printing apparatus 1 of the embodiment of the present disclosure uses the UV curable ink 65, which includes a low-molecular-weight monomer with a molecular weight of 250 or less as a monomer for carrying out photopolymerization, so an excellent effect is exhibited in which the penetration into the print medium is enhanced, the UV curable ink 65 ejected from the ejection unit 10 and landing on the print medium 50 easily penetrates therein even if the heating temperature of the print medium is low, e.g., 40° C., the smoothness of the ink layer surface is improved, and a favorable image quality is obtained.

The inkjet printing apparatus 1 of the embodiment of the present disclosure uses the UV curable ink 65, which includes a monofunctional monomer as a monomer for carrying out a photopolymer reaction, so an excellent effect is exhibited in which the UV curable ink 65 ejected from the ejection unit 10 and landing on the print medium 50 easily penetrates therein, the smoothness of the ink layer surface is improved, and a favorable image quality is obtained.

In the inkjet printing apparatus 1 of the embodiment of the present disclosure, the UV curable ink contains N-vinyl-ε-caprolactam, which is an N-vinyl compound, so that when the UV curable ink 65 contains an acrylate compound, photopolymerization occurs more easily, and therefore an excellent effect is exhibited in which photopolymerization occurs quickly after the ultraviolet light irradiation so that the ink colors do not mix easily.

In the inkjet printing apparatus 1 of the embodiment of the present disclosure, the UV light source 20 irradiates the print medium 50 with the ultraviolet light 70 on the surface of the print medium 50 so as to maintain a state in which the curing rate of the UV curable ink 65 is no greater than 10% within 10 seconds of the landing, and therefore an excellent effect is exhibited in which the penetration of the UV curable ink 65 into the print medium 50 is promoted, improving the smoothness, and excessive fluidity is suppressed so that the ink colors do not mix easily.

In the inkjet printing apparatus 1 of the embodiment of the present disclosure, the UV curable ink 65 lands on the surface of the print medium 50, the ultraviolet light 70 is emitted from the UV light source 20, and, after a prescribed time has elapsed, the ultraviolet light 70 is emitted again to carry out the permanent curing in which the UV curing is completed, and therefore an excellent effect is exhibited in which the UV curable ink 65 penetrates into the print medium 50, improving the smoothness, and the UV curable ink 65 does not flow excessively so that the ink colors do not mix easily, for a favorable image quality.

If the smoothness of the ink layer surface is poor, when the transparent laminate film is pasted on the surface of the printed matter for protection, fine bubbles are caught along the unevenness of the ink surface layer, and visible defects called silver rings occur. In the inkjet printing apparatus 1 of the embodiment of the present disclosure, the smoothness of the ink layer surface is improved, so an excellent effect is exhibited in which silver rings are suppressed.

In the inkjet printing apparatus 1 of the embodiment of the present disclosure, the heating of the vinyl chloride, which is the print medium 50, and the timing of the UV curing by the ultraviolet light 70 are controlled, i.e., the irradiation time and the amount of the ultraviolet light 70 are adjusted so as to maintain the curing rate of the UV curable ink 65 at no greater than 10% within 10 seconds of the UV curable ink droplets 60 landing on the surface of the print medium, so that an effect is exhibited in which the penetration of the UV curable ink 65 into the print medium 50 is promoted and both smoothness improvement and high image quality are achieved. An effect is exhibited in which stickiness and film function reduction due to curing defects in the low-print density portions are prevented. An effect is exhibited in which visual defects (silver rings) when the laminate film 100 is pasted in order to protect the printing face are reduced.

The inkjet printing apparatus and the inkjet printing method of the present disclosure are not limited to the embodiment described above and may, of course, be variously modified within a scope that does not deviate from the gist of the present disclosure.

For example, a modified example may be considered in which the amount of the photopolymerization initiator is decreased in order to maintain a state in which the curing rate of the UV curable ink is no greater than 10% within 10 seconds of the UV curable ink landing on the surface of the print medium.

Another modified example may be considered of a method in which a print medium is irradiated with infrared rays or the like instead of providing a heating unit in the inkjet printing apparatus as a method for heating the print medium.

What is claimed is:

1. An inkjet printing apparatus for printing a UV curable ink onto a print medium, the inkjet printing apparatus comprising:
   an ejection unit configured to eject the UV curable ink; and
   a UV light source configured to irradiate an ultraviolet light to the UV curable ink landed on the print medium,
      wherein the UV light source irradiates the ultraviolet light to the UV curable ink landed on the print medium, so as to maintain a state in which a curing rate of the UV curable ink is no greater than 10% within 10 seconds of landing on the print medium, wherein the print medium is formed from vinyl chloride, wherein the inkjet printing apparatus further comprises: a heating unit configured to heat the print medium, and the heating unit either heats the print medium to a temperature at which a solvent contained in the UV curable ink landed on the print medium does not volatilize or heats the print medium in a state in which the UV curable ink that lands on the print medium contains substantially no solvent.

2. The inkjet printing apparatus according to claim 1, wherein the UV curable ink contains substantially no solvent and contains at least 30 wt % of a monomer with a molecular weight of 300 or less.

3. The inkjet printing apparatus according to claim 2, wherein the monomer is a monofunctional monomer.

4. The inkjet printing apparatus according to claim 2, wherein the monomer contains 13 wt % to 22 wt % of N-vinyl-ε-caprolactam as a component in the UV curable ink.

5. The inkjet printing apparatus according to claim 3, wherein the monomer contains 13 wt % to 22 wt % of N-vinyl-ε-caprolactam as a component in the UV curable ink.

6. The inkjet printing apparatus according to claim 1, wherein a provisional curing is carried out in which the UV curable ink lands on the print medium and is provisionally cured with the ultraviolet light emitted by the UV light source and then, after a prescribed time has elapsed, a permanent curing is carried out by emitting the ultraviolet light again to complete the curing.

7. The inkjet printing apparatus according to claim 2, wherein a provisional curing is carried out in which the UV curable ink lands on the print medium and is provisionally cured with the ultraviolet light emitted by the UV light source and then, after a prescribed time has elapsed, a permanent curing is carried out by emitting the ultraviolet light again to complete the curing.

8. The inkjet printing apparatus according to claim 3, wherein a provisional curing is carried out in which the UV curable ink lands on the print medium and is provisionally cured with the ultraviolet light emitted by the UV light source and then, after a prescribed time has elapsed, a permanent curing is carried out by emitting the ultraviolet light again to complete the curing.

9. The inkjet printing apparatus according to claim 4, wherein a provisional curing is carried out in which the UV curable ink lands on the print medium and is provisionally cured with the ultraviolet light emitted by the UV light source and then, after a prescribed time has elapsed, a permanent curing is carried out by emitting the ultraviolet light again to complete the curing.

10. The inkjet printing apparatus according to claim 5, wherein a provisional curing is carried out in which the UV curable ink lands on the print medium and is provisionally cured with the ultraviolet light emitted by the UV light source and then, after a prescribed time has elapsed, a permanent curing is carried out by emitting the ultraviolet light again to complete the curing.

11. The inkjet printing apparatus according to claim 1, further comprising:

a lamination unit configured to paste a laminate film on the UV curable ink after printing.

12. The inkjet printing apparatus according to claim 2, further comprising:

a lamination unit configured to paste a laminate film on the UV curable ink after printing.

13. The inkjet printing apparatus according to claim 3, further comprising:

a lamination unit configured to paste a laminate film on the UV curable ink after printing.

14. The inkjet printing apparatus according to claim 4, further comprising:

a lamination unit configured to paste a laminate film on the UV curable ink after printing.

15. An inkjet printing method for printing a UV curable ink onto a print medium, the inkjet printing method comprising:

an ejection step for ejecting the UV curable ink;

a curing step for curing the UV curable ink landed on the print medium through an ultraviolet light irradiated by a UV light source, wherein the UV light source irradiates the ultraviolet light to the UV curable ink landed on the print medium, so as to maintain a state in which a curing rate of the UV curable ink is no greater than 10% within 10 seconds of landing on the print medium; and a heating step for heating the print medium, wherein the print medium formed from vinyl chloride is used as the print medium, and the print medium is heated.

* * * * *